United States Patent
Kilchyk

(10) Patent No.: US 12,320,326 B2
(45) Date of Patent: Jun. 3, 2025

(54) TRAILING EDGE NOISE REDUCTION USING AN AIRFOIL WITH AN INTERNAL BYPASS CHANNEL

(71) Applicant: Hamilton Sundstrand Corporation, Charlotte, NC (US)

(72) Inventor: Viktor Kilchyk, Lancaster, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/831,588

(22) Filed: Jun. 3, 2022

(65) Prior Publication Data
US 2023/0392575 A1  Dec. 7, 2023

(51) Int. Cl.
*F03D 1/06* (2006.01)

(52) U.S. Cl.
CPC ...... *F03D 1/0633* (2013.01); *F05B 2240/303* (2020.08); *F05B 2240/304* (2020.08); *F05B 2250/323* (2013.01); *F05B 2250/324* (2013.01); *F05B 2260/60* (2013.01); *F05B 2260/96* (2013.01)

(58) Field of Classification Search
CPC .. F03D 1/0633; F03D 7/022; F05B 2240/303; F05B 2240/304; F05B 2250/323; F05B 2250/324; F05B 2260/60; F05B 2260/96; F05B 2240/30; Y02T 50/10
See application file for complete search history.

(56) References Cited

U.S. PATENT DOCUMENTS

| | | | | |
|---|---|---|---|---|
| 2,507,611 | A * | 5/1950 | Pappas | B64C 21/02 244/198 |
| 3,262,658 | A * | 7/1966 | Reilly | B64C 23/00 244/207 |
| 3,298,636 | A * | 1/1967 | Arnholdt | B64C 23/005 244/198 |
| 5,613,649 | A | 3/1997 | Schlinker et al. | |
| 6,004,095 | A | 12/1999 | Waitz et al. | |
| 6,464,171 | B2 * | 10/2002 | Ruffin | B64C 30/00 244/210 |
| 7,143,983 | B2 * | 12/2006 | McClure | B64C 15/14 244/90 A |

(Continued)

FOREIGN PATENT DOCUMENTS

| KR | 20120102838 A | 9/2012 |
|---|---|---|
| WO | 2023287431 A1 | 1/2023 |

OTHER PUBLICATIONS

Extended European Search Report dated Oct. 19, 2023, for corresponding European Patent Application No. 23177108.0.

*Primary Examiner* — David E Sosnowski
*Assistant Examiner* — Wayne A Lambert
(74) *Attorney, Agent, or Firm* — Kinney & Lange, P.A.

(57) ABSTRACT

An airfoil includes a first end opposite a second end in a spanwise direction. A leading edge extends in the spanwise direction from the first end to the second end and a trailing edge extends in the spanwise direction from the first end to the second end and aft of the leading edge in a chordwise direction. A suction surface extends from the leading edge to the trailing edge and a pressure surface extends from the leading edge to the trailing edge. The airfoil further includes at least one channel with an inlet on a surface of the leading edge and an outlet aft of the leading edge.

4 Claims, 6 Drawing Sheets

(56) References Cited

U.S. PATENT DOCUMENTS

| | | | | |
|---|---|---|---|---|
| 8,133,008 B2* | 3/2012 | Tsuchiya | ............... | F01D 5/145 |
| | | | | 416/232 |
| 8,449,255 B2* | 5/2013 | Tadayon | ............... | F16H 1/28 |
| | | | | 416/37 |
| 9,194,369 B2* | 11/2015 | Dixon | ............... | F03D 7/022 |
| 9,512,821 B2* | 12/2016 | Baruzzini | ............ | F15D 1/0095 |
| 10,337,493 B2* | 7/2019 | Chen | ............... | F03D 3/062 |
| 11,111,025 B2* | 9/2021 | Zha | ............... | B64D 15/04 |
| 2003/0150962 A1* | 8/2003 | Orban | ............... | F04D 29/681 |
| | | | | 244/209 |
| 2007/0014657 A1* | 1/2007 | Parera | ............... | F03D 1/0633 |
| | | | | 415/2.1 |
| 2011/0142638 A1* | 6/2011 | McGrath | ............ | F03D 1/0675 |
| | | | | 416/91 |
| 2011/0229320 A1 | 9/2011 | Hancock et al. | | |
| 2011/0229329 A1 | 9/2011 | Occhipinti | | |
| 2014/0286787 A1* | 9/2014 | Philipsen | ............ | F03D 1/0675 |
| | | | | 416/236 R |
| 2016/0009374 A1* | 1/2016 | Glezer | ............... | B64C 21/08 |
| | | | | 137/1 |
| 2016/0177922 A1 | 6/2016 | Zamora Rodriguez et al. | | |
| 2017/0268480 A1* | 9/2017 | Gertz | ............... | F03D 1/0633 |

* cited by examiner

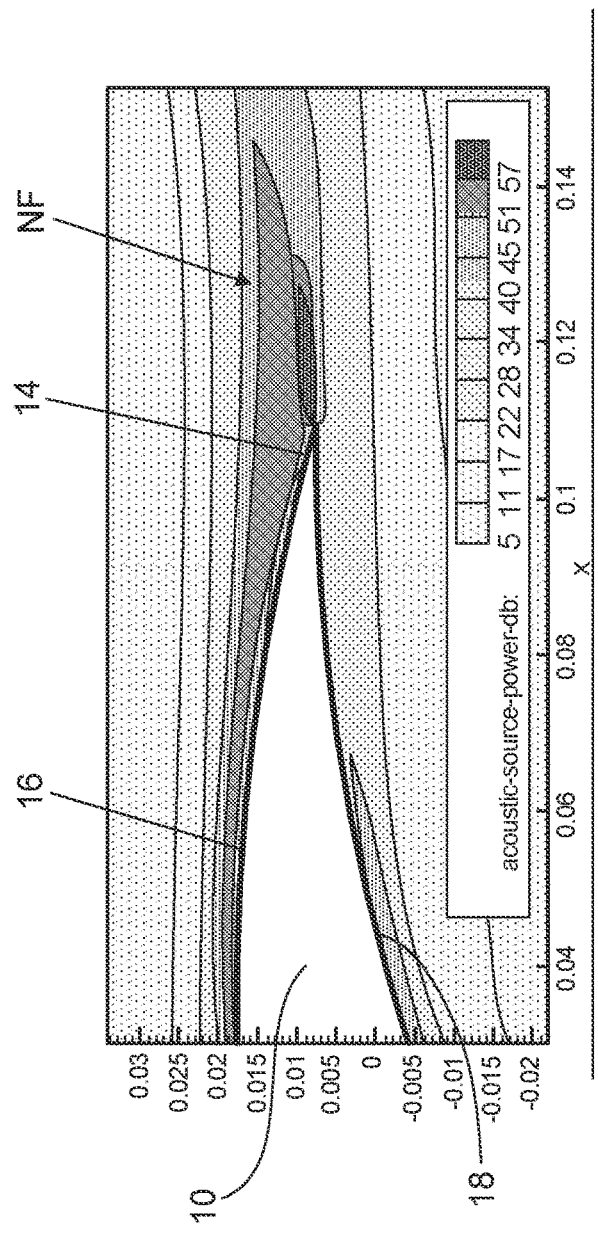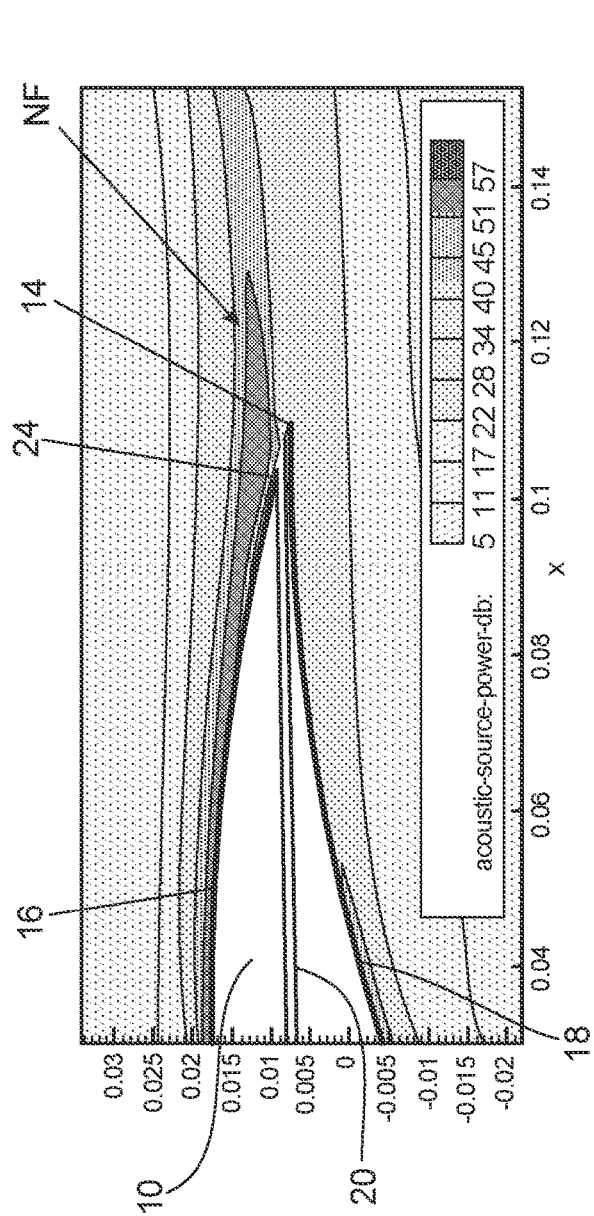
Fig. 3A (PRIOR ART)
Fig. 3B

TRAILING EDGE NOISE REDUCTION USING AN AIRFOIL WITH AN INTERNAL BYPASS CHANNEL

BACKGROUND

The present disclosure relates to airfoil design, and in particular, to reducing trailing edge noise of an airfoil.

Noise generation by airfoils in both rotating blades and non-rotating blades is a key design point for various airfoil applications. For example, noise generation at the trailing edge of wind turbine blades is a dominant issue restricting wind turbine performance. At large rotational velocities, wind turbine blades generate strong noise that may be harmful to the ecosystem around the turbine.

An example prior-art turbine blade 100 is shown in cross-section in FIG. 1. As shown in FIG. 1, prior-art turbine blade 100 includes leading edge 120, trailing edge 140, suction surface 160, and pressure surface 180. As flow F of a working fluid (such as air) traverses prior-art turbine blade 100, pressure-side boundary-layer stream PS is formed on pressure surface 180 and suction-side boundary-layer stream SS is formed on suction surface 160. Momentum differences between pressure-side boundary-layer stream PS and suction-side boundary-layer stream SS create rapid pressure fluctuations when the two boundary-layer streams meet proximate trailing edge 140. As these pressure fluctuations are swept over trailing edge 140 with the moving flow F, two main components contribute to noise generation: the high-frequency component produced by small-scale boundary-layer turbulence BLT; and the low-frequency component produced by the larger-scale shed vortical structures VS. Different solutions have been proposed to reduce these two components to reduce noise generation of prior-art turbine blade 100, however, these solutions are overly complex and expensive, and/or have negative effects (such as increased airfoil drag) that prevent these solutions from wide commercial usage.

SUMMARY

In one example, an airfoil includes a first end opposite a second end in a spanwise direction and a leading edge extending in the spanwise direction from the first end to the second end. The airfoil also includes a trailing edge extending in the spanwise direction from the first end to the second end and is aft of the leading edge in a chordwise direction. A suction surface extends from the leading edge to the trailing edge and a pressure surface extends from the leading edge to the trailing edge. The airfoil also includes a plurality of channels. Each channel of the plurality of channels includes an inlet proximate the leading edge and an outlet proximate the trailing edge.

In another example, an airfoil includes a first end opposite a second end in a spanwise direction. A leading edge extends in the spanwise direction from the first end to the second end and a trailing edge extends in the spanwise direction from the first end to the second end and aft of the leading edge in a chordwise direction. A suction surface extends from the leading edge to the trailing edge and a pressure surface extends from the leading edge to the trailing edge. The airfoil further includes at least one channel with an inlet on a surface of the leading edge and an outlet aft of the leading edge.

Persons of ordinary skill in the art will recognize that other aspects and embodiments of the present invention are possible in view of the entirety of the present disclosure, including the accompanying figures.

BRIEF DESCRIPTION OF THE DRAWINGS

FIG. 3A is a cross-sectional view of a trailing edge of the prior-art turbine blade of FIG. 1 along with a noise profile of the trailing edge of the prior-art turbine blade.

FIG. 3B is a cross-sectional view of a trailing edge of the turbine blade of FIG. 2 along with a noise profile of the trailing edge of the turbine blade.

Figure 1:
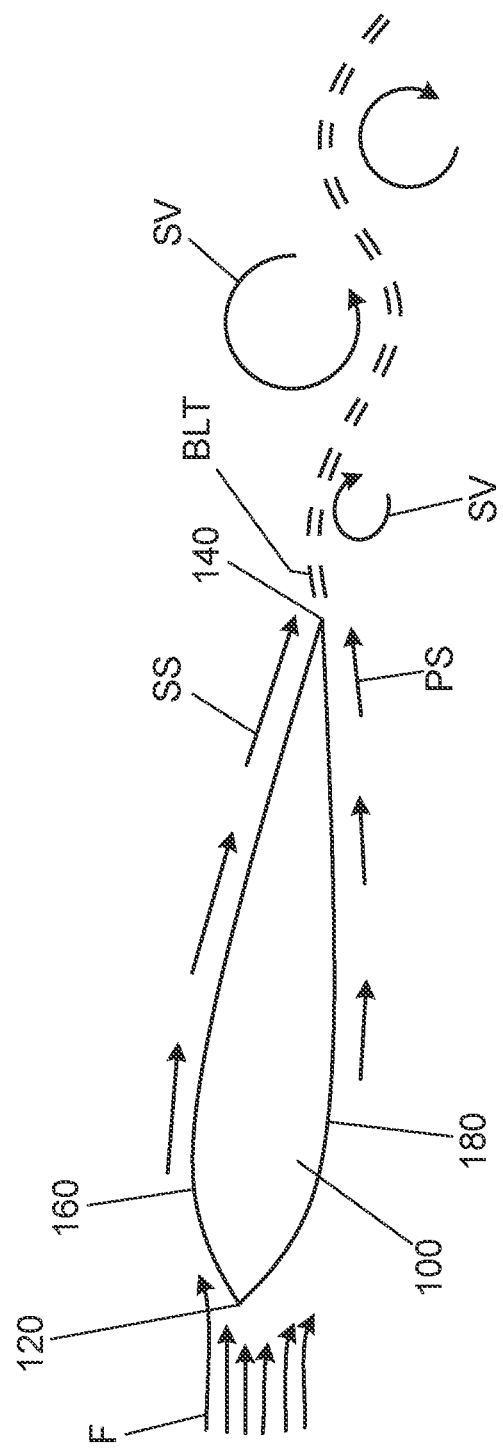
FIG. 1 is cross-sectional view of a prior-art turbine blade.

While the above-identified drawing figures set forth one or more embodiments, other embodiments are also contemplated. It should be understood that numerous other modifications and embodiments can be devised by those skilled in the art, which fall within the scope and spirit of the principles of the claims. The figures may not be drawn to scale, and applications and embodiments may include features and components not specifically shown in the drawings.

DETAILED DESCRIPTION

The disclosure provides a turbine blade with channels. Each channel has an inlet on a leading edge of the turbine blade and an outlet proximate a trailing edge of the turbine blade. The channels allow a working fluid (such as air) to flow from a higher-pressure region near a stagnation point at a front of the turbine blade to a lower-pressure region near the trailing edge of the turbine blade. As the working fluid exits the channels near the trailing edge, the working fluid separates a pressure-side stream and a suction-side stream and reduces a momentum difference between the pressure-side stream and the suction-side stream. By reducing the momentum difference between the pressure-side stream and the suction-side stream, the working fluid exiting the channels lowers the frequency of vortex shedding at the trailing edge which lowers noise intensity of the trailing edge in comparison to prior art airfoils that do not include the channels. The turbine blade with channels is discussed in greater detail below with reference to FIGS. 2-6.

Figure 2:
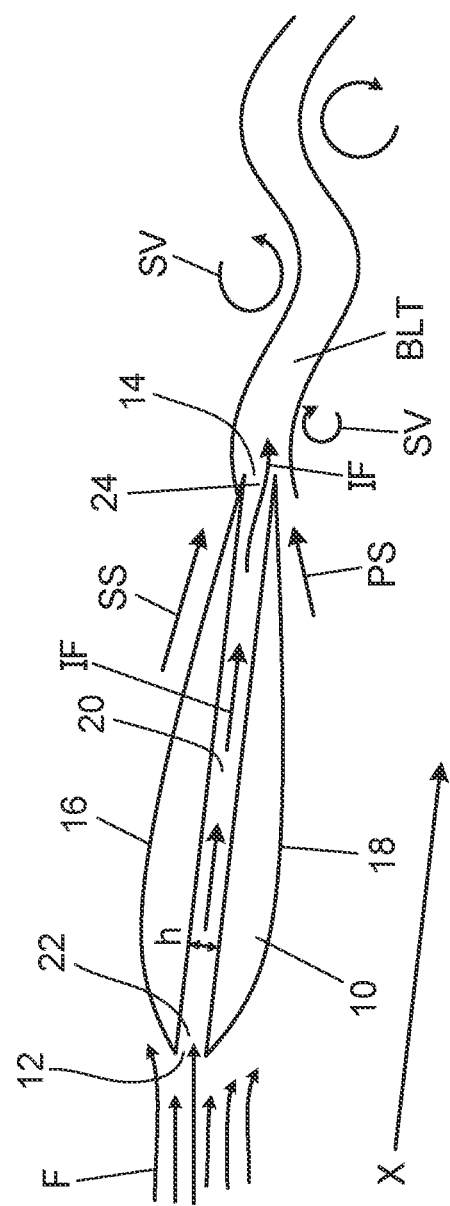
FIG. 2 is cross-sectional view of a turbine blade with a channel.

FIG. 2 is cross-sectional view of airfoil 10. In the embodiment of FIG. 2, airfoil 10 is a wind turbine blade. As shown in FIG. 2, airfoil 10 includes leading edge 12, trailing edge 14, suction surface 16, pressure surface 18, and a plurality of channels 20. In the cross-sectional view of airfoil 10 in FIG. 2, only one of the plurality of channels 20 is visible. Trailing edge 14 is aft of leading edge 12 in a chordwise direction X and relative to flow F of a working fluid (such as air). Suction surface 16 extends from leading edge 12 to trailing edge 14 and pressure surface 18 also extends from leading edge 12 to trailing edge 14. A thickness of airfoil 10 is defined as the distance between pressure surface 18 and suction surface 16 for any given position of chord.

Each channel 20 includes an inlet 22 proximate leading edge 12 and an outlet 24 proximate trailing edge 14. For the purposes of this disclosure, proximate to leading edge 12 is defined as being within 10% of chord from leading edge 12. Proximate to trailing edge 14 is defined as being within 40% of chord from trailing edge 14. In the embodiment of FIG. 2, outlet 24 of each channel 20 is on trailing edge 14 and inlet 22 of each channel 20 is on leading edge 12. Each channel 20 extends through airfoil 10 between suction surface 16 and the pressure surface 18 from inlet 22 to outlet 24.

During operation of airfoil 10, flow F of a working fluid (which is air for a wind turbine blade) traverses airfoil 10, pressure-side boundary-layer stream PS is formed on pressure surface 18 and suction-side boundary-layer stream SS is formed on suction surface 16. Momentum differences between pressure-side boundary-layer stream PS and suction-side boundary-layer stream SS create pressure fluctuations when the two boundary-layer streams meet proximate trailing edge 14. As these pressure fluctuations are swept over trailing edge 14 with the moving flow F, boundary-layer turbulence BLT and shed vortical structures VS are formed.

Leading edge 12 is located at a stagnation point of airfoil 10 where flow F impinges on airfoil 10 and creates a high-pressure zone between suction surface 16 and pressure surface 18 at leading edge 12 and inlets 22 of channels 20. Because outlets 24 of channels 20 are located proximate trailing edge 14, flow F near outlets 24 are at a lower pressure than inlets 22. The pressure difference between inlets 22 and outlets 24 causes working fluid at leading edge 12 to enter inlets 22, travel as injection flow IF in channels 20, and for injection flow IF to be injected into boundary-layer turbulence BLT from outlets 24 at trailing edge 24. As injection flow IF enters boundary-layer turbulence BLT, injection flow IF increases a thickness of boundary-layer turbulence BLT which decreases the size and magnitude of shed vortical structures VS. Decreasing the size and magnitude of shed vortical structures VS aft of trailing edge 14 decreases the amount of undesirable noise generated by shed vortical structures VS.

A cross-sectional area H of each channel 20 can be optimized to tailor injection flow IF to the specific operating conditions of airfoil 10 to get the necessary amount of injection flow IF to dampen shed vortical structures VS. In the embodiment of FIG. 2, the cross-sectional area H of each channel 20 is constant from inlet 22 to outlet 24. In other embodiments, the cross-sectional area H of each channel can vary and/or taper in size between inlet 22 and outlet 24 to provide optimum injected flow parameters for injection flow IF at trailing edge 14, including flow Reynolds number, direction and momentum, etc.

The ability of channels 20 to dampen shed vortical structures VS and reduce noise at trailing edge 14 of airfoil 10 was verified using numerical computations, as shown in FIGS. 3A and 3B. FIG. 3A is a cross-sectional view of trailing edge 140 of prior-art turbine blade 100 of FIG. 1 along with a noise profile NF of trailing edge 140 of prior-art turbine blade 100. FIG. 3B is a cross-sectional view of trailing edge 14 of airfoil 10 of FIG. 2 along with a noise profile NF of trailing edge 14. Noise generation was computationally compared between airfoil 10 with injection flow IF from channels 20 and prior-art turbine blade 100 without channels 20 and injection flow IF. The computations were performed with CFD software. Steady state analysis was conducted with a second order compressible solver, a k-omega turbulence model, and a broadband noise source model.

As shown in FIG. 3B, trailing edge 14 of airfoil 10 has a much smaller noise profile NF than trailing edge 140 of prior-art turbine blade 100. Immediately aft of trailing edge 14, the noise profile NF of airfoil 10 is at least 5 dB lower than the same location in FIG. 3A. The portion of the noise profile NF extending off of suction surface 16 of airfoil 10 is also much smaller in size than the same location in FIG. 3A. The computational tests also determined that airfoil lift of airfoil 10 was minimally affected (dropped by less than 1%) by channels 20. However, the presence of channels 20 in airfoil 10 did increase drag of airfoil 10 by about 15%. While an increase in drag may be negative for some airfoil applications, drag increase can be advantageous to the other airfoil applications, such as, for example, wind turbines.

Figure 4:
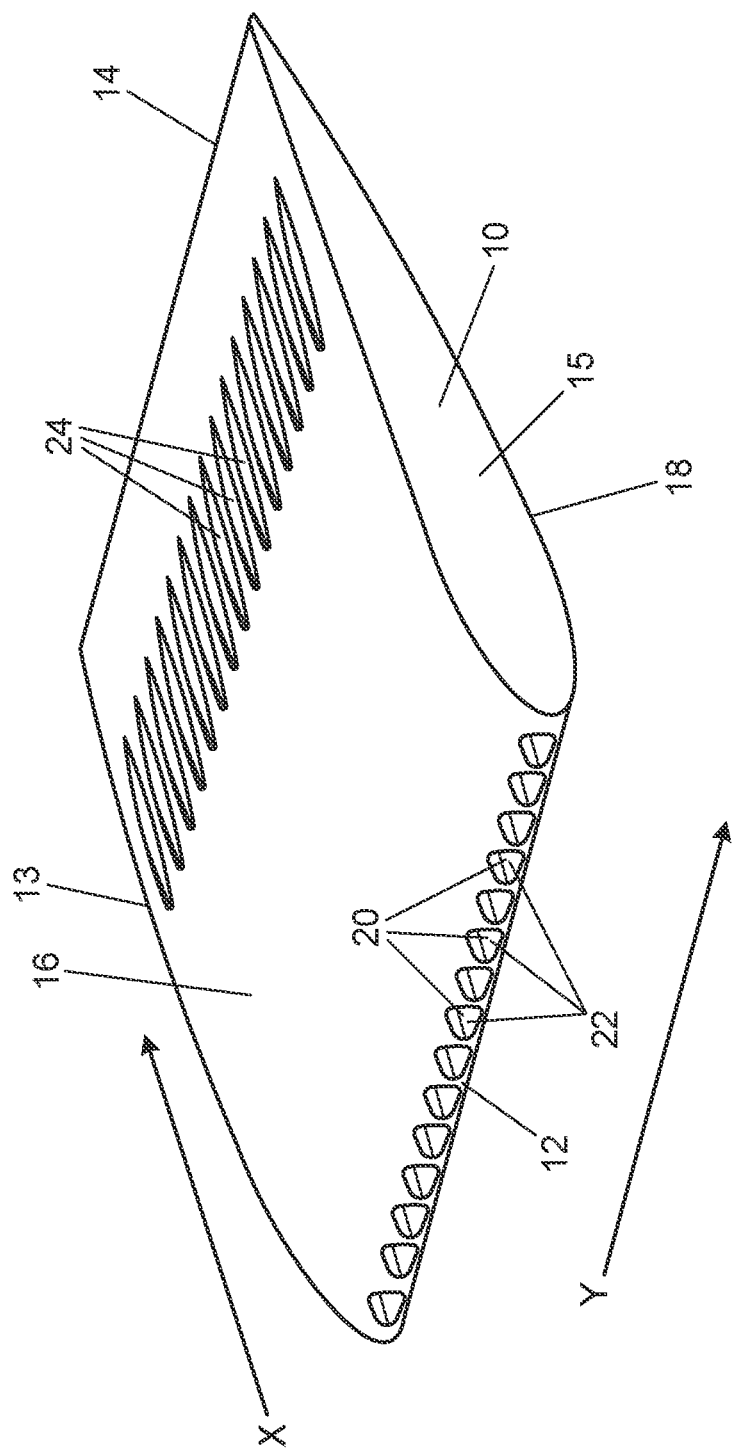
FIG. 4 is a perspective view of another embodiment of the turbine blade with a column of channels extending through the turbine blade.

FIG. 4 is a perspective view of another embodiment of airfoil 10 with a column of channels 20 extending through airfoil 10. As shown in FIG. 4, airfoil 10 includes first end 13 opposite second end 15 in a spanwise direction Y. Leading edge 12 extends in the spanwise direction Y from first end 13 to second end 15. Trailing edge 14 also extends in the spanwise direction Y from first end 13 to second end 15. Trailing edge 14 is spaced aft from leading edge 12 in a chordwise direction X. In the embodiment of FIG. 4, each of channels 20 extends through airfoil 10 and includes an inlet 22 and an outlet 24. Similar to the embodiment of FIG. 2, inlets 22 for channels 20 of the embodiment of FIG. 4 are located on leading 12 and extend through a surface of leading edge 12. Inlets 22 are arranged in a column or line on leading edge 12. In other embodiments, some inlets 22 can be arranged in-line on leading edge 12 while some of inlets 22 can be slightly out of line with leading edge 12 and the rest of inlets 22. In the embodiment of FIG. 4, outlets 24 for channels 20 are on suction surface 16 aft of leading edge 12 and within 40% of chord from trailing edge 14.

Outlets 24 on suction surface 16 are angled relative to suction surface 16 at an angle of less than 30 degrees such that injection flow IF will be substantially aligned with suction surface 16 when injection flow IF exits outlets 24. Though outlets 24 are on suction surface 16 in the embodiment of FIG. 4, outlets 24 are near enough to trailing edge 14 and are angled sufficiently to direct injection flow IF into boundary-layer turbulence BLT at trailing edge 14 to increase a thickness of boundary-layer turbulence BLT and thereby decrease the size and magnitude of shed vortical structures VS. As previously discussed with reference to FIG. 2, decreasing the size and magnitude of shed vortical structures VS aft of trailing edge 14 decreases the amount of undesirable noise generated by shed vortical structures VS.

Figure 5:
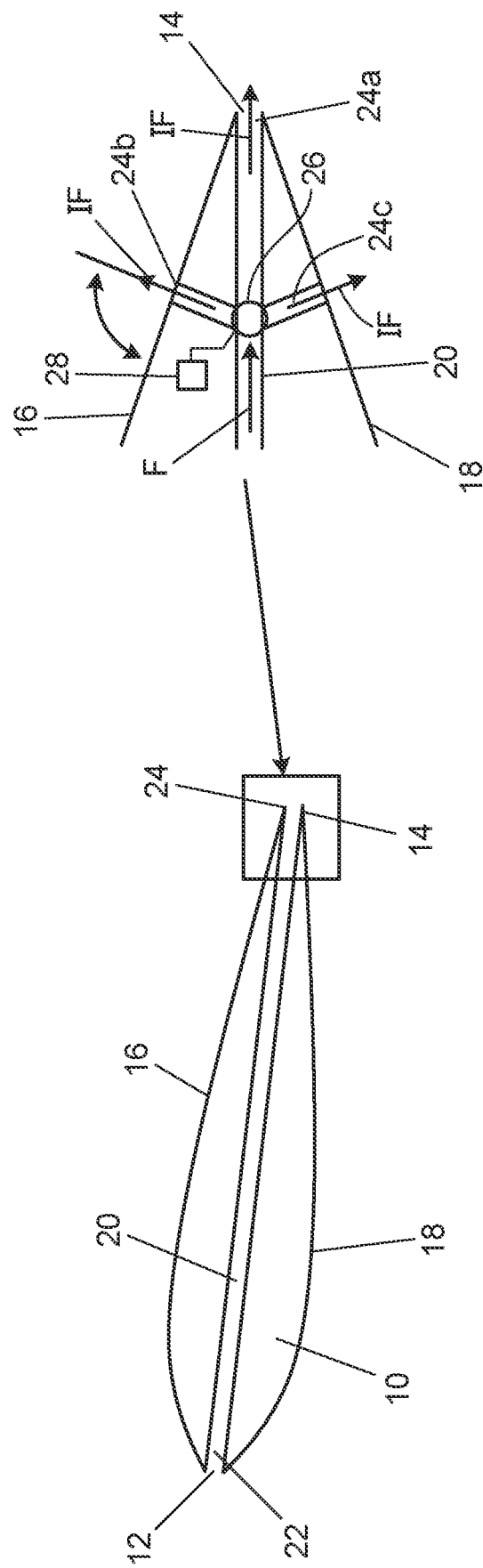
FIG. 5 is a cross-sectional view of another embodiment of the turbine blade with a channel that includes multiple outlets.

FIG. 5 is a cross-sectional view of another embodiment of airfoil 10 with channels Each channel 20 in the embodiment of FIG. 5 includes first outlet 24a, second outlet 24b, and third outlet 24c, all of which are proximate trailing edge 14. First outlet 24a is on trailing edge 14. Second outlet 24b is on suction surface 16 within 20% of chord from trailing edge 14. Third outlet 24c is on pressure surface 18 within 20% of chord from trailing edge 14. Each channel 20 of the plurality of channels 20 includes valve 26 fluidically connected to first outlet 24a, to second outlet 24b, and to third outlet 24c. Control 28 is in communication with valve 26 to selectively open and close valve 26 to modify flow through first outlet 24a, second outlet 24b, and/or third outlet 24c. Control 28 and valve 26 can open (fully or partially) all of outlets 24a, 24b, and 24c at the same time. In another mode, control 28 and valve 26 can open two of outlets 24a, 24b, and 24c while keeping one of outlets 24a, 24b, and 24c closed. In another mode, control 28 and valve 26 can open one of outlets 24a, 24b, and 24c while keeping two of outlets 24a, 24b, and 24c closed. Control 28 and valve 26 can also open and closes outlets 24a, 24b, and 24c in rapid succession to pulse injection flow IF. Valve 26 can be a servo valve or any other valve capable of performing the above-described functions of valve 26 and small enough to be housed within airfoil 10. In an alternative embodiment, trailing edge 14 and portions of suction surface 16 and pressure surface 18 adjacent to trailing edge 14 can be formed from a porous foam material with pores and passages in fluidic communication with the plurality of channels 20 and forming outlets 24 for the plurality of channels 20.

The cross-sectional area H of each channel 20 can vary and/or taper in size between inlet 22 and outlet 24 to provide optimum injected flow parameters for injection flow IF at trailing edge 14, including flow Reynolds number, direction and momentum, etc. In the embodiment of FIG. 5, the cross-sectional area H for each of channels 20 is tapered such that channels 20 converge from inlet 22 to outlet 24. In other embodiments, the cross-sectional area H for each of channels can be tapered such that channels 20 diverge from inlet 22 to outlet 24.

Figure 6:
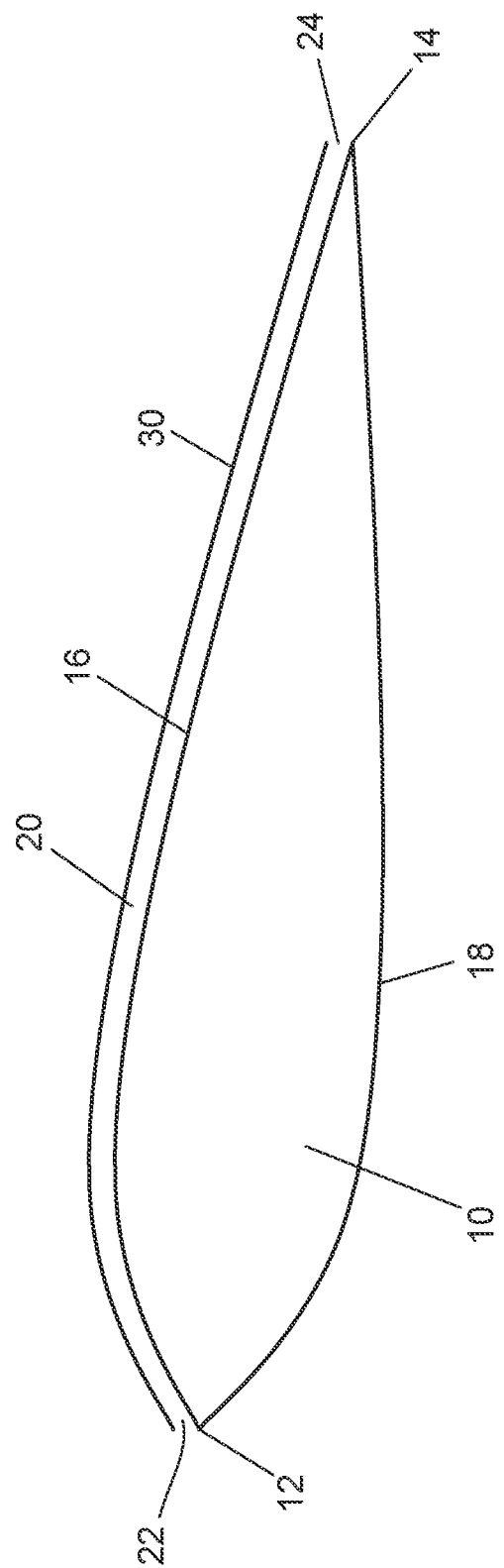
FIG. 6 is a cross-sectional view of another embodiment of the turbine blade with a channel formed on a suction surface of the turbine blade.

FIG. 6 discloses a cross-sectional view of another embodiment of airfoil 10 with channel 20 formed on suction surface 16 of airfoil 10. Each channel 20 of the plurality of channels in the embodiment of FIG. 6 includes a tube 30 on suction surface 16 of airfoil 10. Each tube forms a respective channel 20 and extends from a respective inlet 22 to a respective outlet 24. In other embodiments, tubes 30 and channels 20 can be on pressure surface 18 of airfoil 10. Tubes can be integral with suction surface 16 (or pressure surface 18), or tubes 30 can be mounted onto suction surface 16 (or pressure surface 18).

Discussion of Possible Embodiments

The following are non-exclusive descriptions of possible embodiments of the present invention.

In one embodiment, an airfoil includes a first end opposite a second end in a spanwise direction and a leading edge extending in the spanwise direction from the first end to the second end. The airfoil also includes a trailing edge extending in the spanwise direction from the first end to the second end and is aft of the leading edge in a chordwise direction. A suction surface extends from the leading edge to the trailing edge and a pressure surface extends from the leading edge to the trailing edge. The airfoil also includes a plurality of channels. Each channel of the plurality of channels includes an inlet proximate the leading edge and an outlet proximate the trailing edge.

The airfoil of the preceding paragraph can optionally include, additionally and/or alternatively, any one or more of the following features, configurations and/or additional components:

the outlet is on the trailing edge;

the outlet is on the suction surface and within 40% of chord from the trailing edge;

the inlet is on the leading edge;

each channel of the plurality of channels extends through the airfoil between the suction surface and the pressure surface from the inlet to the outlet;

each channel of the plurality of channels comprises a tube on the suction surface or the pressure surface of the airfoil, and wherein the tube extends from the inlet to the outlet;

each channel of the plurality of channels further comprises: a first outlet on the trailing edge; a second outlet on the suction surface within 20% of chord from the trailing edge; and a third outlet on the pressure surface within 20% of chord from the trailing edge;

each channel of the plurality of channels further comprises: a valve fluidically connected to the first outlet, the second outlet, and the third outlet; and a control in communication with the valve to selectively modify flow through the first outlet, the second outlet, and the third outlet;

each channel of the plurality of channels comprises a channel cross-section that converges between the inlet and the outlet; and/or each channel of the plurality of channels comprises a channel cross-section that diverges between the inlet and the outlet.

In another embodiment, an airfoil includes a first end opposite a second end in a spanwise direction. A leading edge extends in the spanwise direction from the first end to the second end and a trailing edge extends in the spanwise direction from the first end to the second end and aft of the leading edge in a chordwise direction. A suction surface extends from the leading edge to the trailing edge and a pressure surface extends from the leading edge to the trailing edge. The airfoil further includes at least one channel with an inlet on a surface of the leading edge and an outlet aft of the leading edge.

The airfoil of the preceding paragraph can optionally include, additionally and/or alternatively, any one or more of the following features, configurations and/or additional components:

the outlet is on the trailing edge;

the outlet is on the suction surface and within 40% of chord from the trailing edge;

the airfoil further comprises: a plurality of inlets on the leading edge, wherein the plurality of inlets is arranged in a column on the leading edge;

the airfoil further comprises: a plurality of outlets proximate the trailing edge; and a plurality of channels extending between the plurality of inlets and the plurality of outlets;

the at least one channel extends through the airfoil between the suction surface and the pressure surface from the inlet to the outlet;

the at least one channel comprises a tube on the suction surface or the pressure surface of the airfoil, and wherein the tube extends from the inlet to the outlet;

the at least one channel further comprises: a first outlet on the trailing edge; a second outlet on the suction surface within 20% of chord from the trailing edge; and a third outlet on the pressure surface within 20% of chord from the trailing edge;

the at least one channel further comprises: a valve fluidically connected to the first outlet, the second outlet, and the third outlet; and a control in communication with the valve to selectively modify flow through the first outlet, the second outlet, and the third outlet; and/or the at least one channel further comprises a channel cross-section that converges between the inlet and the outlet.

While the invention has been described with reference to an exemplary embodiment(s), it will be understood by those skilled in the art that various changes may be made and equivalents may be substituted for elements thereof without departing from the scope of the invention. For example, while turbine blade 10 has been described above as a wind turbine blade, turbine blade 10 can be a fixed wing of an aircraft, a propeller blade, a vane of a turbomachine or turbine engine, or a rotor blade of a turbomachine or turbine engine. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An airfoil comprising:
    a first end opposite a second end in a spanwise direction;
    a leading edge extending in the spanwise direction from the first end to the second end;
    a trailing edge extending in the spanwise direction from the first end to the second end and aft of the leading edge in a chordwise direction;
    a suction surface extending from the leading edge to the trailing edge;
    a pressure surface extending from the leading edge to the trailing edge; and
    a plurality of channels, wherein each channel of the plurality of channels comprises:
        an inlet at the leading edge;
        an outlet at the trailing edge; and
        a tube on the suction surface or the pressure surface of the airfoil, and wherein the tube extends from the inlet to the outlet.

2. An airfoil comprising:
    a first end opposite a second end in a spanwise direction;
    a leading edge extending in the spanwise direction from the first end to the second end;
    a trailing edge extending in the spanwise direction from the first end to the second end and aft of the leading edge in a chordwise direction;
    a suction surface extending from the leading edge to the trailing edge;
    a pressure surface extending from the leading edge to the trailing edge; and
    at least one channel, wherein the at least one channel comprises:
        an inlet at the leading edge;
        an outlet at the trailing edge; and
        a tube on the suction surface or the pressure surface of the airfoil, and wherein the tube extends from the inlet to the outlet.

3. The airfoil of claim 1, wherein the tube is mounted to the suction surface or the pressure surface of the airfoil.

4. The airfoil of claim 2, wherein the tube is mounted to the suction surface or the pressure surface of the airfoil.

* * * * *